(12) United States Patent
Flaherty et al.

(10) Patent No.: US 6,948,093 B2
(45) Date of Patent: Sep. 20, 2005

(54) DATA PROCESSING ARRANGEMENT AND METHOD

(75) Inventors: Dermot Flaherty, Southampton (GB); David J Fisher, Bournemouth (GB); Stephen J Hobson, Hampton (GB); Paul Hopewell, Chandlers Ford (GB); Paul Kettley, Winchester (GB); Robert D Millar, Fareham (GB); Peter Siddall, Romsey (GB); Stephen R Walker, Lockerley (GB)

(73) Assignee: International Business Machines Corporation, Armonk, NY (US)

(*) Notice: Subject to any disclaimer, the term of this patent is extended or adjusted under 35 U.S.C. 154(b) by 554 days.

(21) Appl. No.: 10/228,636

(22) Filed: Aug. 27, 2002

(65) Prior Publication Data

US 2003/0191984 A1 Oct. 9, 2003

(30) Foreign Application Priority Data

Apr. 8, 2002 (GB) .............................. 0207967

(51) Int. Cl.$^7$ .............................................. G06F 11/00
(52) U.S. Cl. ........................................ 714/13; 711/162
(58) Field of Search .............................. 714/13, 710, 2, 714/5, 6, 8, 42; 711/162, 159

(56) References Cited

U.S. PATENT DOCUMENTS

| | | | | |
|---|---|---|---|---|
| 4,543,630 A | * | 9/1985 | Neches ....................... 709/252 |
| 5,241,669 A | * | 8/1993 | Cohn et al. .................... 714/1 |
| 5,317,739 A | | 5/1994 | Elko et al. ................... 395/650 |
| 5,331,673 A | | 7/1994 | Elko et al. ................... 395/575 |
| 5,339,405 A | | 8/1994 | Elko et al. ................... 395/575 |
| 5,339,427 A | | 8/1994 | Elko et al. ................... 395/725 |
| 5,379,412 A | * | 1/1995 | Eastridge et al. ........... 711/162 |
| 5,388,266 A | | 2/1995 | Frey et al. ................... 395/700 |
| 5,390,328 A | | 2/1995 | Frey et al. ................... 395/650 |
| 5,392,397 A | | 2/1995 | Elko et al. ................... 395/200 |
| 5,394,542 A | | 2/1995 | Frey et al. ................... 395/575 |
| 5,394,554 A | | 2/1995 | Elko et al. ................... 395/800 |
| 5,410,695 A | | 4/1995 | Frey et al. ................... 395/650 |
| 5,450,590 A | | 9/1995 | Elko et al. ................... 395/700 |
| 5,452,445 A | * | 9/1995 | Hallmark et al. .............. 707/2 |
| 5,457,793 A | | 10/1995 | Elko et al. ................... 395/600 |
| 5,463,736 A | * | 10/1995 | Elko et al. ..................... 710/28 |
| 5,465,359 A | | 11/1995 | Allen et al. .................. 395/700 |
| 5,493,668 A | | 2/1996 | Elko et al. ................... 395/457 |
| 5,515,499 A | | 5/1996 | Allen et al. .................. 395/182 |
| 5,537,574 A | | 7/1996 | Elko et al. ................... 395/468 |
| 5,544,345 A | | 8/1996 | Carpenter et al. .......... 395/477 |
| 5,561,809 A | | 10/1996 | Elko et al. ................... 395/800 |
| 5,581,737 A | | 12/1996 | Dahlen et al. ............... 395/497 |
| 5,604,863 A | | 2/1997 | Allen et al. .................. 395/182 |
| 5,630,050 A | | 5/1997 | Neuhard et al. ............. 395/183 |

(Continued)

OTHER PUBLICATIONS

Nick et al "S/390 cluster technology: Parallel Sysplex", IBM Systems Journal, vol. 36, no 2, 1997, pp. 172–201.

*Primary Examiner*—Nadeem Iqbal
(74) *Attorney, Agent, or Firm*—Jeffrey S. LaBaw

(57) ABSTRACT

A data processing arrangement (100) and method for fuzzy backup and restore of MQSeries shared queues held in coupling facility list structure (106). Periodically backups are taken of the data held in the CF list structure by backing up messages in the sequence uncommitted puts (220), committed puts (230), uncommitted gets (240) and expired messages (250), whereby all messages may be backed up in the backup means except for exceptions which are recorded in the record log. In the event of media failure of the coupling facility, data can be restored by restoring messages in the sequence restoring messages from the backup means (320), replaying messages from the record log means (340) and determining final disposition of messages from replay of the record log means (350). This provides the advantage of allowing the number of log records written to be reduced.

23 Claims, 3 Drawing Sheets

U.S. PATENT DOCUMENTS

| | | | |
|---|---|---|---|
| 5,634,072 A | 5/1997 | Allen et al. | 395/674 |
| 5,664,155 A | 9/1997 | Elko et al. | 711/170 |
| 5,737,600 A * | 4/1998 | Geiner et al. | 707/200 |
| 5,742,830 A | 4/1998 | Elko et al. | 395/728 |
| 5,860,115 A | 1/1999 | Neuhard et al. | 711/147 |
| 5,875,484 A | 2/1999 | Neuhard et al. | 711/167 |
| RE37,038 E * | 1/2001 | Eastridge et al. | 714/5 |
| 6,848,037 B2 * | 1/2005 | Flaherty et al. | 711/162 |

* cited by examiner

DATA PROCESSING ARRANGEMENT AND METHOD

CROSS-REFERENCE TO RELATED APPLICATION

This application is related to the commonly owned copending application, incorporated herein by reference, filed on the same date as the present application, titled "DATA PROCESSING ARRANGEMENT AND METHOD".

FIELD OF THE INVENTION

This invention relates to data processing and more particularly to a data processing arrangement and method for facilitating recovery after failure.

BACKGROUND OF THE INVENTION

IBM's MQSeries® is a set of middleware products that allow user applications to intercommunicate using messages, without having to know the complexities of the underlying hardware and software platform. Applications communicate using the MQSeries application programming interface (API), issuing such calls as MQPUT to put a message onto a queue and MQGET to get a message from a queue. In this specification, the terms "get" and "put" are used generally interchangeably with the terms "read" and "write", respectively. MQSeries is described in such publications as MQSeries Planning Guide, IBM GC33-1349-07 (January 1999), incorporated herein by reference.

The IBM S/390® Parallel Sysplex® configuration is a cluster of interconnected processing nodes with attachments to shared storage devices, network controllers, and core cluster technology components, consisting of coupling facilities, coupling support facilities, and external time references (ETRs). A coupling facility (CF) enables high-performance read/write sharing of data by applications running on each node of the cluster through global locking and cache coherency management mechanisms. It also provides cluster-wide queuing mechanisms for workload distribution and message passing between nodes.

The coupling facility is described in the following patents and publications, incorporated herein by reference:

"IN A MULTIPROCESSING SYSTEM HAVING A COUPLING FACILITY, COMMUNICATING MESSAGES BETWEEN THE PROCESSORS AND THE COUPLING FACILITY IN EITHER A SYNCHRONOUS OPERATION OR AN ASYNCHRONOUS OPERATION", by D. A. Elko et al., Ser. No. 08/420,893, filed Apr. 11, 1995, now U.S. Pat. No. 5,561,809;

"Sysplex Shared Data Coherency Method And Means", by D. A. Elko et al., Ser. No. 07/860,805, filed Mar. 30, 1992, now U.S. Pat. No. 5,537,574;

"Method And Apparatus For Distributed Locking Of Shared Data, Employing A Central Coupling Facility", by D. A. Elko et al., Ser. No. 07/860,808, filed Mar. 30, 1992, now U.S. Pat. No. 5,339,427;

"Command Quiesce Function", by D. A. Elko et al., Ser. No. 07/860,330, filed Mar. 30, 1992, now U.S. Pat. No. 5,339,405;

"Software Cache Management Of A Shared Electronic Store In A Sysplex", by D. A. Elko et al., Ser. No. 07/860,807, filed Mar. 30, 1992, now U.S. Pat. No. 5,457,793;

"Multiple Processor System Having Software For Selecting Shared Cache Entries Of An Associated Castout Class For Transfer To A DASD With One I/O Operation", by D. A. Elko et al, Ser. No. 07/860,806, filed Mar. 30, 1992, now U.S. Pat. No. 5,493,668;

"Command Execution System For Using First And Second Commands To Reserve And Store Second Command Related Status Information In Memory Portion Respectively", by D. A. Elko et al., Ser. No. 07/860,378, filed Mar. 30, 1992, now U.S. Pat. No. 5,392,397;

"Integrity Of Data Objects Used To Maintain State Information For Shared Data At A Local Complex", by D. A. Elko et al., Ser. No. 07/860,800, filed Mar. 30, 1992, now U.S. Pat. No. 5,331,673;

"Management Of Data Objects Used To Maintain State Information For Shared Data At A Local Complex", by J. A. Frey et al., Ser. No. 07/860,797, filed Mar. 30, 1992, now U.S. Pat. No. 5,388,266;

"Clearing Data Objects Used To Maintain State Information For Shared Data At A Local Complex When At Least One Message Path To The Local Complex Cannot Be Recovered", by J. A. Frey et al., Ser. No. 07/860,647, filed Mar. 30, 1992, now U.S. Pat. No. 5,394,542;

"Coupling Facility For Receiving Commands From Plurality Of Hosts For Activating Selected Connection Paths To I/O Devices And Maintaining Status Thereof", by D. A. Elko et al., Ser. No. 08/324,447, filed Oct. 18, 1994, now U.S. Pat. No. 5,463,736;

"Data Processing System And Method For Providing Notification In A Central Processor Of State Changes For Shared Data Structure On External Storage", by J. A. Frey et al., Ser. No. 07/860,809, filed Mar. 30, 1992, now U.S. Pat. No. 5,390,328;

"Method And Apparatus For Performing Conditional Operations On Externally Shared Data", by J. A. Frey et al., Ser. No. 08/383,532, filed Feb. 1, 1995, now U.S. Pat. No. 5,742,830;

"Apparatus And Method For List Management In A Coupled Data Processing System", by J. A. Frey et al., Ser. No. 07/860,633, filed Mar. 30, 1992, now U.S. Pat. No. 5,410,695;

"Interdicting I/O And Messaging Operations In A Multi-System Complex", by D. A. Elko et al., Ser. No. 07/860,489, filed Mar. 30, 1992, now U.S. Pat. No. 5,394,554;

"Method And Apparatus For Coupling Data Processing Systems", by D. A. Elko et al., Ser. No. 07/860,803, filed Mar. 30, 1992, now U.S. Pat. No. 5,317,739;

"Authorization Method For Conditional Command Execution", by D. A. Elko et al., Ser. No. 08/408,446, filed Mar. 22, 1995, now U.S. Pat. No. 5,450,590;

"Dynamically Assigning a Dump Space in a Shared Data Facility to Receive Dumping Information to be Captured", by D. A. Elko et al., Ser. No. 08/471,895, filed Jun. 7, 1995, now U.S. Pat. No. 5,664,155;

"Method And System For Capturing and Controlling Access To Information In A Coupling Facility", by D. E. Neuhard et al., Ser. No. 08/146,647, filed Nov. 1, 1993, now U.S. Pat. No. 5,630,050;

"Method and System for Determining and Overriding Information Unavailability Time at a Coupling Facility", by D. A. Neuhard et al., Serial. No. 08/779,196, filed Jan. 6, 1997, now U.S. Pat. No. 5,875,484;

"Requesting a Dump of Information Stored within a Coupling Facility, in Which the Dump Includes Serviceability Information from an Operating System That Lost Communication with the Coupling Facility", by D. A. Neuhard et al., Ser. No. 08/779,195, filed Jan. 6, 1997, now U.S. Pat. No. 5,860,115;

"Method and Apparatus for Expansion, Contraction, and Reapportionment of Structured External Storage Structures", by D. J. Dahlen et al., Ser. No. 08/304,458, filed Sep. 12, 1994, now U.S. Pat. No. 5,581,737;

"Method of Managing Resources in One or More Coupling Facilities Coupled to One or More Operating Systems in One or More Central Programming Complexes Using a Policy", by R. A. Allen et al., Ser. No. 08/607,053, filed Feb. 26, 1996, now U.S. Pat. No. 5,634,072;

"Method and System for Managing Data and Users of Data in a Data Processing System", by R. A. Allen, Ser. No. 08/146,727, filed Nov. 1, 1993, now U.S. Pat. No. 5,465,359;

"Method and System for Reconfiguring a Storage Structure Within a Structure Processing Facility", by R. A. Allen et al., Ser. No. 08/544,941, filed Oct. 18, 1995, now U.S. Pat. No. 5,515,499;

"Method for Coordinating Executing Programs in a Data Processing System", by R. A. Allen et al., Ser. No. 08/439,269, filed May 9, 1995, now U.S. Pat. No. 5,604,863;

"Coherence Controls for Store-Multiple Shared Data Coordinated by Cache Directory Entries in a Shared Electronic Storage", by K. S. Carpenter et al., Ser. No. 08/148,707, filed Nov. 8, 1993, now U.S. Pat. No. 5,544,345;

"Method and System for Log Management in a Coupled Data Processing System", by R. V. Geiner et al., Ser. No. 08/632,683, filed Apr. 15, 1996, now U.S. Pat. No. 5,737,600; and J. M. Nick et al., "S/390 cluster technology: Parallel Sysplex", IBM Systems Journal, vol. 36, no. 2, 1997, pages 172–201.

In the field of this invention it is known that fuzzy backup of a database can be achieved by copying the database in parallel with updates by a database engine to create a 'fuzzy' backup, and then (if required) restoring the database from that fuzzy backup and forward recovering it by application of log records cut by the database engine which describe the updates that were performed since the start of the fuzzy backup.

From U.S. Pat. No. 5,884,328 there is known a database mirroring mechanism based on a fuzzy backup and incremental changes. However, this known mechanism is particularly related to maintaining replicas in real time rather than re-creating a replica later in time from earlier-recorded data.

In MQSeries systems it is possible to exploit the Coupling Facility List Structure architecture for the storage of messages on shared queues.

Since the data representing messages stored by MQSeries in a Coupling Facility List structure is able to move from one list to another as the unit of work state progresses, extending the technique of fuzzy backup to MQSeries messages stored on a Coupling Facility List structure could potentially lead to excessive amounts of logging describing deletes of data from one list and inserts of the same data to a different list. This approach would therefore have the disadvantage that lots of log records would get cut as the messages transition from key to key and from list to list.

Note, this is true not just for such an MQSeries system but for any system based upon similar principles for moving data around/accessing data.

STATEMENT OF INVENTION

Accordingly, the present invention provides an apparatus for backing up a plurality of data elements in a data processing system, wherein the data elements exist in an ordered plurality of states, the apparatus comprising: means for backing up data elements grouped by state, the order in which groups are backed up corresponding to the order of the states in which the data elements exist; and means for logging changes in data in the data processing system.

Preferably all data elements except for exceptions are backed up by the backup means and the logging means comprises: means for determining exceptions; and means for logging the exceptions.

The exceptions may comprise at least one of data elements that move through all states before backup; data elements that are added after backup has started; and data elements that are rolled back from a given state to the previous state in the order.

According to the preferred embodiment, if data elements are determined to be moving though all states before the backup, the logging means logs the state transitions for those data elements.

Preferably the logging means comprises means for logging state transitions for each data element.

Preferably the data elements are messages in a messaging system and the ordered plurality of states comprise: uncommitted puts, committed puts, uncommitted gets, and expired messages.

In the preferred embodiment the backup means further comprises means for backing up a given state twice. This may involve backing up uncommitted gets before backing up the ordered plurality of states.

In one embodiment the data processing system comprises a S/390 processor arranged to run an OS/390 operating system.

In one embodiment, the apparatus comprises: coupling means coupled to the data processing system and arranged to store at least one shared queue of the data elements, wherein the backup means is for holding a backup of the data elements held in the coupling means and wherein the log means is for recording changes in data elements stored in the coupling means; and wherein the apparatus further comprises: restore means coupled to the coupling means, the backup means and the log means for restoring coupling means data elements from the backup means and the log means in event of failure; wherein the data elements are messages and the backup means is arranged to backup messages in the sequence uncommitted puts, committed puts, uncommitted gets and expired messages, whereby all messages may be backed up in the backup means except for exceptions which are recorded in the log.

Preferably it is possible to perform a restore of data elements in the sequence restoring backed up data elements, replaying logged data elements and determining the final disposition of data elements from the replay of the log.

In a further aspect, the invention provides a method of backing up a plurality of data elements in a data processing system, wherein the data elements exist in an ordered plurality of states, the method comprising the step of: backing up data elements grouped by state, the order in which groups are backed up corresponding to the order of the states in which the data elements exist; and logging changes in data in the data processing system.

In a yet further aspect, the invention provides a computer program for backing up a plurality of data elements in a data processing system, the computer program comprising program code means adapted to, when run on a computer, perform a method comprising the steps of: backing up data elements grouped by state, the order in which groups are backed up corresponding to the order of the states in which the data elements exist; and logging changes to the data in the data processing system.

The invention is based on use of knowledge of how message data moves from one list to another at unit of work state transitions, and the fact that unit of work state transitions already have the transition logged, to minimize the quantity of data logged.

BRIEF DESCRIPTION OF THE DRAWINGS

A preferred embodiment of the present invention will now be described by way of example only and with reference to the following drawings.

DESCRIPTION OF PREFERRED EMBODIMENT

The following terms, used throughout this description, are reproduced here for ready reference.

A "backout" (or "abort") is an operation that reverses all the changes made during the current unit of work. After the operation is complete, a new unit of work begins.

A "commit" is an operation that applies all the changes made during the current unit of work. After the operation is complete, a new unit of work begins.

A "syncpoint" is an intermediate or end point during processing of a transaction at which the transaction's protected resources are consistent. At a syncpoint, changes to the resources can safely be committed, or they can be backed out to the previous syncpoint.

A "unit of work" is a recoverable sequence of operations performed by an application between two points of consistency. A unit of work begins when a transaction starts or after a user-requested syncpoint. It ends either at a user-requested syncpoint or at the end of a transaction.

Figure 1:
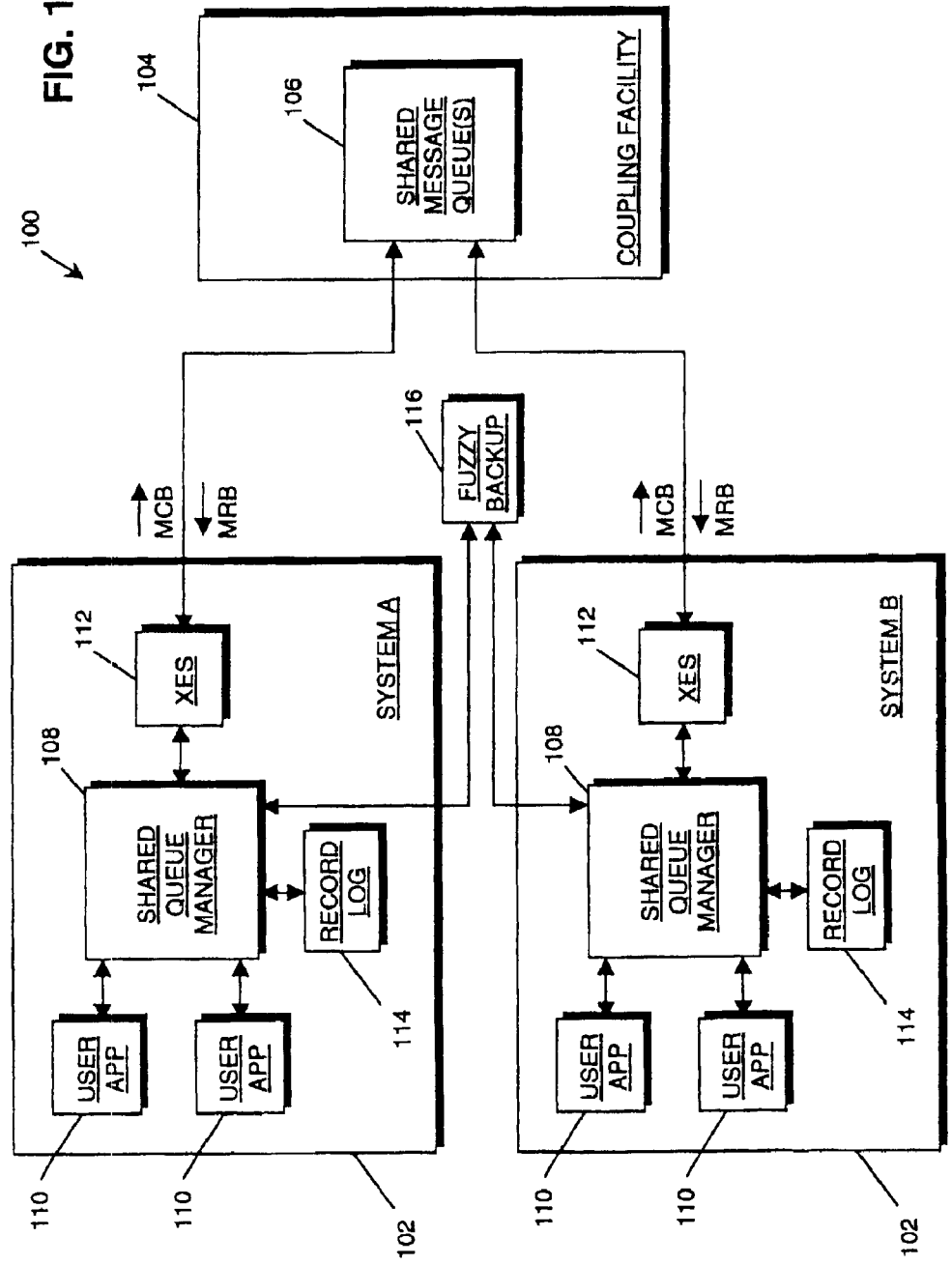
FIG. 1 shows an MQSeries multiple-system complex (sysplex) incorporating a preferred embodiment of the present invention.

FIG. 1 shows the general configuration of a MQSeries system complex (sysplex) 100 incorporating a preferred embodiment of the present invention. Sysplex 100 comprises a plurality of systems 102 (an exemplary two of which, System A and System B, are shown), each of which is connected to a coupling facility (CF) 104 within which one or more shared message queues 106 are maintained. As is conventional, each system 102 comprises one or more processors and an operating system (not separately shown) and may constitute either a separate physical machine or a logical partition of a logically partitioned machine. Similarly, coupling facility 104 may constitute either a separate physical machine or a logical partition of a logically partitioned machine. Although the invention is not so limited, in a preferred embodiment the physical machines may be IBM S/390 Parallel Enterprise Server® processors, while the operating system is the IBM OS/390® operating system.

Within each system 102, user applications 110 perform sequences of operations, referred to herein as units of work (UOWs), on shared message queues 106 via a shared queue manager (SQM) 108 resident on that system. Shared queue managers 108 on different systems 102 that share the same message queue 106 are referred to herein as a queue-sharing group (QSG). Each shared queue manager 108 in turn interacts with the coupling facility via a component 112 of the OS/390 operating system known as Sysplex Services for Data Sharing (XES). Sysplex Services for Data Sharing (XES) is described more fully in the IBM publication MVS/ESA Programming: Sysplex Services Guide, GC28-1495-02 (June 1995), incorporated herein by reference.

User applications 110 on a system 102 interact with the shared queue manager 108 on that system via a series of Message Queue Interface (MQI) calls, the most important of which are MQPUT (to put a message onto a message queue 106) and MQGET (to get a message from a message queue 106). In response to such a call, shared queue manager 108 issues a call to XES 112 to invoke a requested system service to communicate with the coupling facility 104. In response to receiving a call from a shared queue manager 108, XES 112 sends an appropriate message command block (MCB) containing data and other operands to the coupling facility 104 to perform the requested operation. XES 112 receives back from the coupling facility 104 a message response block (MRB) containing data and/or a response code. As part of its list-processing capability, coupling facility 104 performs requested operations on lists composed of one or more entries.

Each shared queue manager 108 maintains a record log 114 of all message transactions involving the CF 104. Periodically, one of the shared queue managers 108 uses XES services 112 to read the contents of the coupling facility 104 and record them in a fuzzy backup 116.

The present invention, according to the preferred embodiment, is based on the protocol of backup sequence and logging described below:

A message stored in a CF list structure can be in one of 5 states, which are:
1. uncommitted put
2. committed put
3. uncommitted get
4. committed get
5. expired It has been observed by the present inventor(s) that in MQSeries systems a message can only move forward (in numerically ascending order) through this list, except for the case of the rollback of an MQGET where the message can move from being an uncommitted get back to being a committed put.

Consequently, it has been realised by the present inventor(s) that by performing the backup of messages stored in the CF in the order:
1. uncommitted puts
2. committed puts
3. uncommitted gets
4. expired messages (A)

there will always be recorded in the backup every message except those:
  that move through all the states ahead of the backup; or
  that are put after the backup has started; or
  that are rolled back from being uncommitted gets to committed puts (the one backward transition).

Further, it has been realised by the present inventor(s) that the log can be relied on to provide message data for the exception cases:
  for messages that move through the states ahead of the backup process, the log will contain the transitions, but from a recovery perspective, no data is needed because the final state is that the message no longer exists in the CF;
  for messages put after the backup has started, message data is logged when put (i.e., null to uncommitted put transition) in an INSERT log record;

for messages that are rolled back during the backup process message data is logged in an UNDELETE log record—however, we observe that for most transactional activity, backout is unusual and so in the majority of cases message data is logged only once (at MQPUT time), thus minimizing the logging performed by 'normal' paths through the code and the quantity of log data which must be read and applied to the fuzzy backup to restore a consistent view of the CF list structure.

Figure 2:
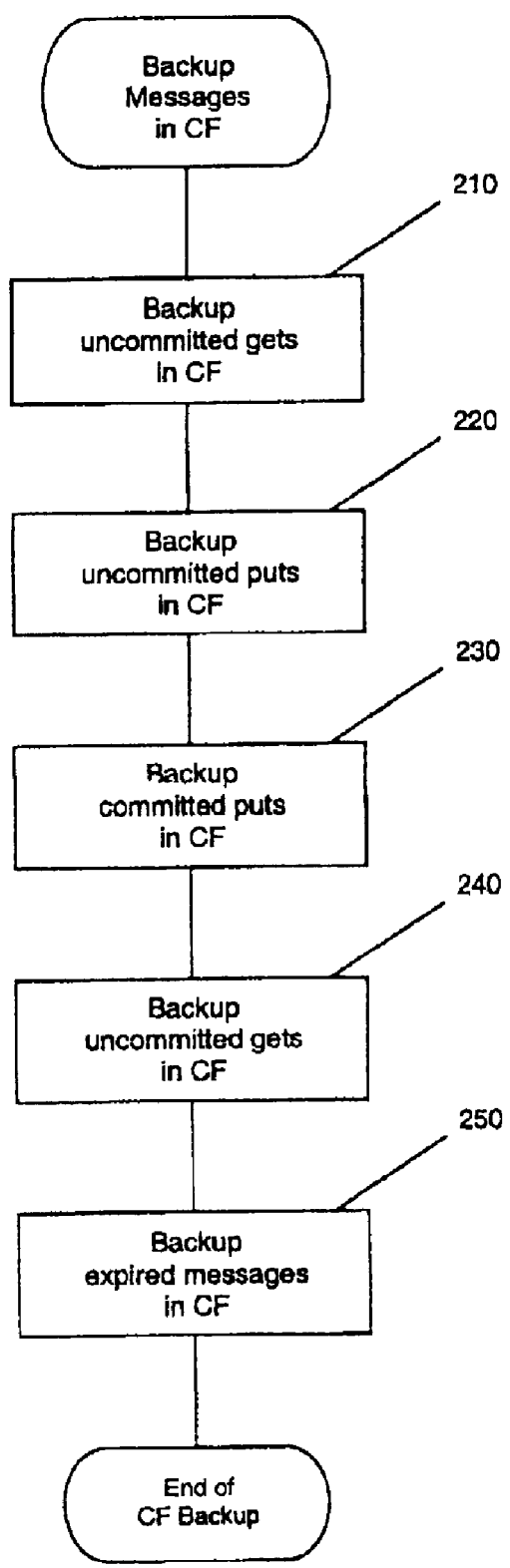
FIG. 2 shows a flowchart illustrating the 'message backup' method sequence in the Coupling Facility (CF) used in the sysplex of FIG. 1.
Figure 3:
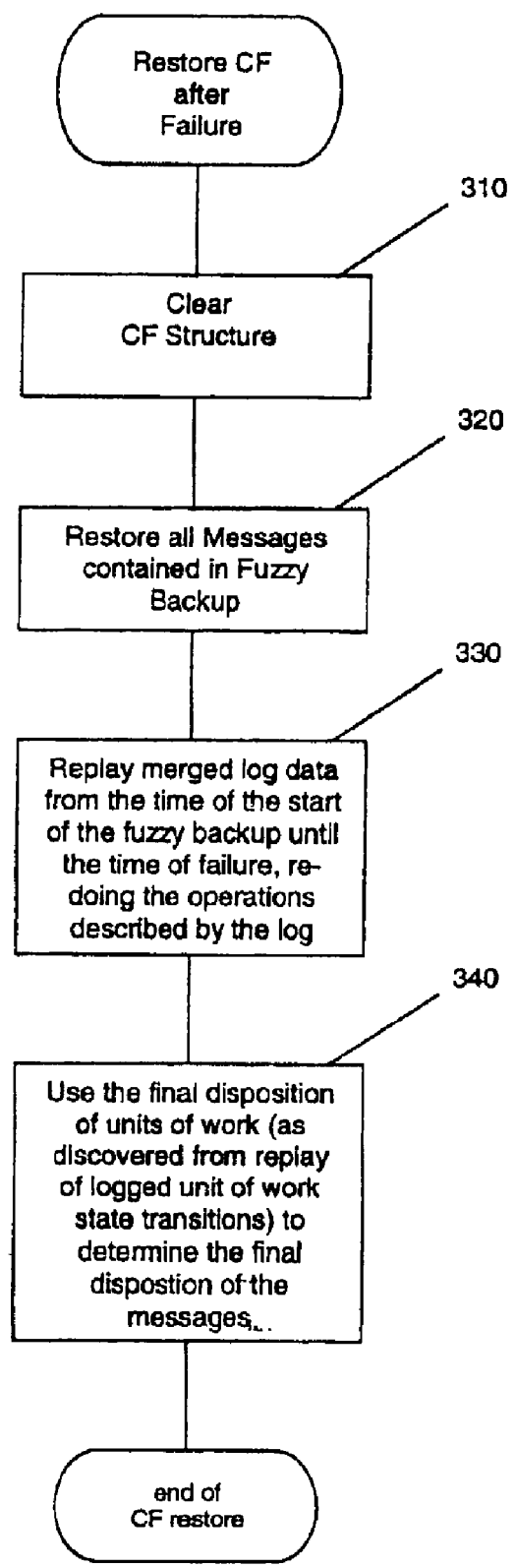
FIG. 3 shows a flowchart illustrating the 'restore CF after failure' method sequence used in the sysplex of FIG. 1.

Referring now to FIG. 2 and FIG. 3, utilising the above properties of CF list structure, an improved Backup/Recover Protocol used in the sysplex 100 is summarized as follows:

As shown in FIG. 2, messages in the CF 104 are backed up in the following sequence:
- step 210 uncommitted gets
- step 220 uncommitted puts
- step 230 committed puts
- step 240 uncommitted gets
- step 250 expired messages As will be explained in greater detail below, the step 210 occurs (in order to avoid a possible timing problem) before steps 220–230 corresponding to the 'core' ordered backup sequence referred to at (A) above.

Supporting this backup sequence:
CF operation INSERT is logged with message data and the unique identity of the message after writing the message to the CF.

CF operation UNDELETE is logged with message data and the unique identity of the message before the CF message transition.

CF operation DELETE only logs the unique identity of the message after the CF message transition.

All unit of work state transitions are logged (see later).

As shown in FIG. 3, to restore the CF after a failure, the following sequence is used:

Step 310 Start with a cleared CF structure

Step 320 Restore all the messages contained in the fuzzy backup

Step 330 Replay the merged (from all systems which have performed recoverable updates on this structure) log data from the time of the start of the fuzzy backup until the time of failure, re-doing the operations described by the log Step 340 Use the final disposition of units of work (as discovered from replay of logged unit of work state transitions) to determine the final disposition of the messages.

In use of the sysplex 100 to perform the improved backup/restore protocol described above, the following may be noted:

i. Unit of work state transitions are always logged and these are used to determine the final disposition of messages (e.g., at the end of CF recovery should the message be in the CF as a committed message, or was it backed out.)

ii. When a message get is performed, the identification of the message is logged (in a DELETE log record)—there is no need to log the message content.

iii. The CF operations (INSERT, DELETE) are logged after the operation has been performed. This removes a potential timing window problem where a slow putter could log data before the backup starts (beginning of replay log scope), but not move the data to the uncommitted or committed put state until that section of the list had been backed up so the data would not appear in the fuzzy backup either.

iv. The rollback of a get (UNDELETE) message must be logged (and the log forced) before the message is transitioned from uncommitted get to committed put in the CF. This is because the queue manager performing the rollback could fail immediately after the CF message transition and the log is being relied on to provide the data (so it must be ensured that the log contains the data).

Point (iv) can cause UNDELETE to be exposed to the same timing window described in point (iii). This can be resolved by backing up uncommitted gets twice, the first time at the beginning of the backup thus ensuring capture of data of any uncommitted gets which are about to move and whose UNDELETE log records happened before the beginning of the replay scope. For this reason, it may be observed that in the sequence of FIG. 2 the initial step 210 (backup uncommitted gets) occurs before steps corresponding to the 'core' ordered backup steps (uncommitted puts, committed puts, uncommitted gets, expired messages) referred to at (A) above.

It will be understood that although the invention has been described above in the context of an MQSeries sysplex, the invention is not necessarily limited to MQSeries systems and may be used more generally in other arrangements, particularly where data is accessed by a key and the key associated with an element of data is changed as the data changes from uncommitted (locked) state to committed (unlocked, i.e., available to other applications) state.

In summary, it will be understood that the fuzzy backup of shared queues held in coupling facility list structure described above provides the following advantages:

Although the coupling facility list structure effectively provides keyed access to data held in the structure, and techniques for media recovery by replaying log records (typically insert, change, delete) operations are well understood for record oriented media, traditional logging techniques would require explicit log records be cut each time the key of one of these pieces of data was changed, or the data moved from one list to another (i.e., delete on first list, insert on second).

In contrast, the technique of the present invention is based on exploitation of knowledge of how systems such as MQSeries systems change keys and move data, and thus the number of log records written can be reduce

What is claimed is:

1. An apparatus for backing up a plurality of data elements in a data processing system, wherein the data elements exist in an ordered plurality of states, the apparatus comprising:
   means for backing up data elements grouped by state, the order in which groups are backed up corresponding to the order of the states in which the data elements exist; and
   means for logging changes in data in the data processing system.

2. The apparatus of claim 1, wherein all data elements except for exceptions are backed up by the backup means, and wherein the logging means comprises:
   means for determining exceptions; and
   means for logging the exceptions.

3. The apparatus of claim 2 wherein the exceptions comprise at least one of:
   data elements that move through all states before backup;
   data elements that are added after backup has started; and
   data elements that are rolled back from a given state to the previous state in the order.

4. The apparatus of claim 3, wherein if data elements are determined to be moving though all states before the backup, the logging means logs the state transitions for those data elements.

5. The apparatus of claim 1, wherein the logging means comprises:

means for logging state transitions for each data element.

6. The apparatus of claim 1, wherein the data elements are messages in a messaging system and the ordered plurality of states comprise:

uncommitted puts, committed puts, uncommitted gets, and expired messages.

7. The apparatus of claim 1, wherein the backup means further comprises means for backing up a given state twice.

8. The apparatus of claim 6, wherein the backup means comprises means for backing up uncommitted gets before backing up the ordered plurality of states.

9. The apparatus of claim 1, wherein the data processing system comprises a S/390 processor arranged to run an OS/390 operating system.

10. The apparatus of claim 1 comprising:

coupling means coupled to the data processing system and arranged to store at least one shared queue of the data elements, wherein the backup means is for holding a backup of the data elements held in the coupling means and wherein the log means is for recording changes in data elements stored in the coupling means; and wherein the apparatus further comprises:

restore means coupled to the coupling means, the backup means and the log means for restoring coupling means data elements from the backup means and the log means in event of failure;

wherein the data elements are messages and the backup means is arranged to backup messages in the sequence uncommitted puts, committed puts, uncommitted gets and expired messages, whereby all messages may be backed up in the backup means except for exceptions which are recorded in the log.

11. The apparatus of claim 1, comprising means for performing a restore of data elements in the sequence restoring backed up data elements, replaying logged data elements and determining the final disposition of data elements from the replay of the log.

12. A method of backing up a plurality of data elements in a data processing system, wherein the data elements exist in an ordered plurality of states, the method comprising the step of:

backing up data elements grouped by state, the order in which groups are backed up corresponding to the order of the states in which the data elements exist; and logging changes in data in the data processing system.

13. The method of claim 12, wherein all data elements except for exceptions are backed up by the backup step, and wherein the step of logging changes comprises:

determining exceptions; and logging the exceptions.

14. The method of claim 13 wherein the exceptions comprise at least one of:

data elements that move through all states before backup;

data elements that are added after backup has started; and data elements that are rolled back from a given state to the previous state in the order.

15. The method of claim 14, wherein if data elements are determined to be moving though all states before the backup, logging only the state transitions for those data elements.

16. The method of claim 12, wherein the step of logging changes comprises:

logging state transitions for each data element.

17. The method of claim 12, wherein the data elements are messages in a messaging system and the ordered plurality of states comprise:

uncommitted puts, committed puts, uncommitted gets, and expired messages.

18. The method of claim 12, wherein the backup step further comprises backing up a given state twice.

19. The method of claim 17, wherein the step of backing up further comprises backing up uncommitted gets before backing up the ordered plurality of states.

20. The method of claim 12, wherein the data processing system comprises an S/390 processor arranged to run an OS/390 operating system.

21. The method of claim 12, wherein the data processing system comprises:

coupling means arranged to store at least one shared queue of the data elements, and wherein the backup means is for holding a backup of the data elements held in the coupling means, and wherein the log means is for recording changes in data elements stored in the coupling means; and wherein the data processing system further comprises:

restore means coupled to the coupling means, the backup means and the log means for restoring coupling means data elements from the backup means and the log means in event of failure;

wherein the data elements are messages, the method comprising in the backup means performing backup of messages in the sequence uncommitted puts, committed puts, uncommitted gets and expired messages, whereby all messages are backed up in the backup means except for exceptions which are recorded in the log.

22. The method of claim 12, comprising the steps of performing a restore of data elements in the sequence restoring backed up data elements, replaying logged data elements and determining the final disposition of data elements from the replay of the log.

23. A computer program for backing up a plurality of data elements in a data processing system, the computer program comprising program code means adapted to perform the method of claim 12.

* * * * *